United States Patent [19]

Lundström

[11] 4,078,671

[45] Mar. 14, 1978

[54] ARRANGEMENT AT INDUSTRIAL ROBOTS

[76] Inventor: Göran O. Lundström, 40, Kristinelundsvagen, Solna, Sweden, S-171 57

[21] Appl. No.: 720,529

[22] Filed: Sep. 7, 1976

Related U.S. Application Data

[63] Continuation of Ser. No. 532,579, Dec. 13, 1974, abandoned.

[51] Int. Cl.² .............................................. G25J 11/00
[52] U.S. Cl. ............................... 214/1 BB; 214/1 BS; 294/64 R; 294/93
[58] Field of Search ............. 214/1 CM, 1 BB, 1 BT, 214/1 BS, 1 BH, 1 BV; 294/63 A, 64 R, 93; 3/1.2, 21, 12.8

[56] References Cited

U.S. PATENT DOCUMENTS

| 1,546,726 | 7/1925 | Geise | 3/12.8 |
|---|---|---|---|
| 3,007,176 | 11/1961 | Hafner | 3/1.2 |
| 3,052,494 | 9/1962 | Williamson | 294/93 |
| 3,362,706 | 1/1968 | Busse | 294/64 R X |
| 3,558,171 | 1/1971 | Netsch et al. | 294/64 R |
| 3,619,818 | 11/1971 | Collins | 3/12.2 X |
| 3,834,558 | 9/1974 | Bru | 214/1 BT |
| 3,904,042 | 9/1975 | Colston | 3/1.2 X |

Primary Examiner—Robert J. Spar
Assistant Examiner—Donald W. Underwood
Attorney, Agent, or Firm—Pollock, Vande Sande & Priddy

[57] ABSTRACT

An improved arrangement for industrial robots is disclosed. The arrangement is unexpensive to manufacture and it enables the robot to grasp and handle objects without scratching or in any other respect destroying them. The part of the arrangement which comes into contact with the object is easily exchangeable, whereby the robot quickly may be adapted to handle objects of almost any shape. If desired the position, in which the objects are to be delivered, may be defined with close tolerances, whereas the position, from which the objects are collected may be defined with moderate tolerances.

6 Claims, 15 Drawing Figures

ARRANGEMENT AT INDUSTRIAL ROBOTS

This is a continuation, of application Ser. No. 532,579, filed Dec. 13, 1974, now abandoned.

BACKGROUND OF THE INVENTION

In industry there is an increased use of industrial robots. The aim is to eliminate monotonous manual labour, to substitute machines for manual labour in dangerous environments, to increase the safety of the workers and to reduce costs. There has been a problem, however, in providing suitable grasping devices by which the industrial robot handles the objects. Schematically the object is to be collected from one position which is defined with certain tolerances, to be grasped without being damaged, and to be delivered to another position which is defined with certain other tolerances.

The most common prior art grasping devices emanate from the human hand: the industrial robot moves the grasping device to that position in which the object to be handled is expected to be situated, whereafter the grasping device grasps and lifts the object by means of a plurality of fingers or claws. An advantage with such grasping device is that limited deviations in the object's actual position with respect to the expected, ideal object position are in many cases acceptable. Another advantage is that the same grasping device may be used for handling objects of various shapes which provides the industrial robot with a certain flexibility. This flexibility is important to obtain a high level of availability of the industrial robot, as for example in factories having mixed production. However, the flexibility is limited: grasping devices of this kind may only be used for handling objects of certain shapes and certain nature, i.e. the objects must be comparatively robust.

In the handling of objects where the aforesaid grasping devices are impracticable, it has been necessary to design special grasping devices, from case to case, adapted to the particular shape, material, etc., of the object. A common disadvantage of such especially designed grasping devices has been that the flexibility mentioned above is lost. Further, the position from which the object to be handled is collected must be defined within very close tolerances, a fact which in most cases necessitates a separate positioning operation prior to the actual grasping.

SUMMARY OF THE INVENTION

According to the present invention there is provided apparatus which is simple and inexpensive to manufacture and which is capable of grasping and handling objects without scratching or in any other respect damaging them. The part of the apparatus which comes into contact with the object is easily exchangeable without using any special tools, whereby the industrial robot easily and quickly may be adapted to handle objects of almost any shape.

BRIEF DESCRIPTION OF THE DRAWINGS

The invention is defined in the appended claims and some embodiments are described below with reference to the drawings, in which:

DETAILED DESCRIPTION OF THE PREFERRED EMBODIMENTS

Figure 1:
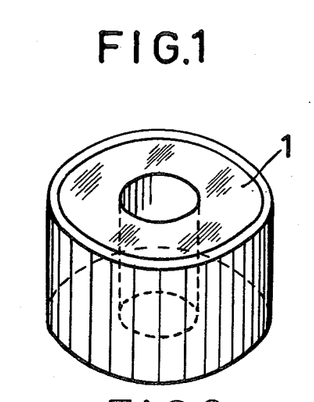
FIG. 1 shows an object, a shiftable tool bit to be handled by an industrial robot.
Figure 2:
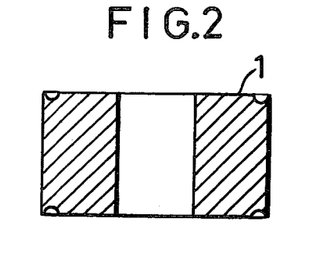
FIG. 2 is a section through the object shown in FIG. 1.

In FIG. 1 there is shown a symmetrical shiftable tool bit 1 for a turning-lathe, which tool bit has been manufactured by powder-pressing techniques. The tool bit has a generally hollow cylindrical shape, the two plane end surfaces each being provided with a circular groove. As an object to be treated by an industrial robot, the tool bit has a comparatively uncomplicated shape. FIG. 2 is a side view in section of the tool bit shown in FIG. 1.

Figure 3:
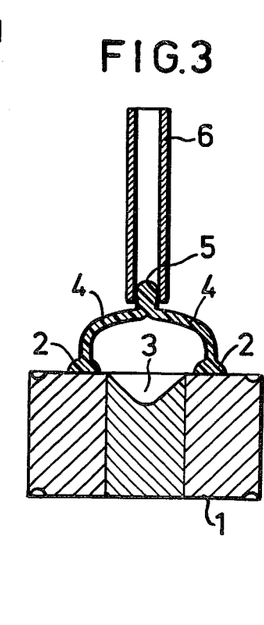
FIGS. 3–5 are side views, in section, of various steps of the manufacture of a grasping device according to the invention for the handling of the object of FIG. 1 by an industrial robot.
Figure 4:
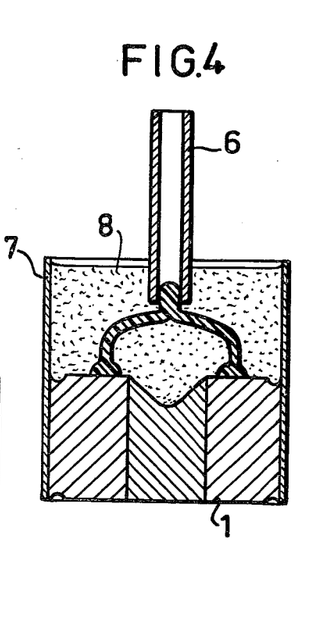
Figure 5:
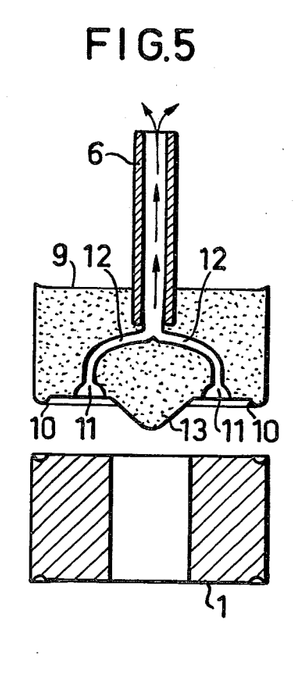

FIGS. 3–5 show various steps of the manufacture of a grasping device according to the invention for the handling of objects having the shape of the object 1 shown in FIGS. 1–2. On the upper surface of the object 1, elevations 2 of limited size are provided, said elevations being formed of an easily setting material, e.g., wax, modelling clay or thermosetting resin and having the shape of a half annular torus or a plurality of small islands around the surface of the object 1, as shown in FIG. 3. The central aperture of the object 1 has been filled with the same material, although a tapering depression 3 has been left unfilled. Some strings 4 are also formed, e.g., at wax, which strings in their upper ends are joined to a plug 5, which is inserted in a tube 6.

In FIG. 4 a simple casting form 7 has been provided around the object 1. The casting form 7 may be made of tape, thin sheet-metal or the like and has a function only when casting composition 8 is filled therein, which composition is in a liquid state whereby all free spaces within the form 7 are well filled. The casting composition may suitably comprise, for example, two-component silicon rubber or polyurethanes. When the casting composition has settled to a predetermined softness and elasticity, the mould 7 and the object 1 are removed. The elevations 2, the strings 4 and the plug 5 are melted by heat treatment and thereby removed, whereafter the finished grasping device 9 exhibits contact surfaces 10 adapted to the shape of the object 1 and provided with open cavities 11, which are connected to the tube 6 through canals 12. Further, the grasping device 9 is provided with a projection 13 corresponding to the central aperture of the object to be handled.

Figure 6:
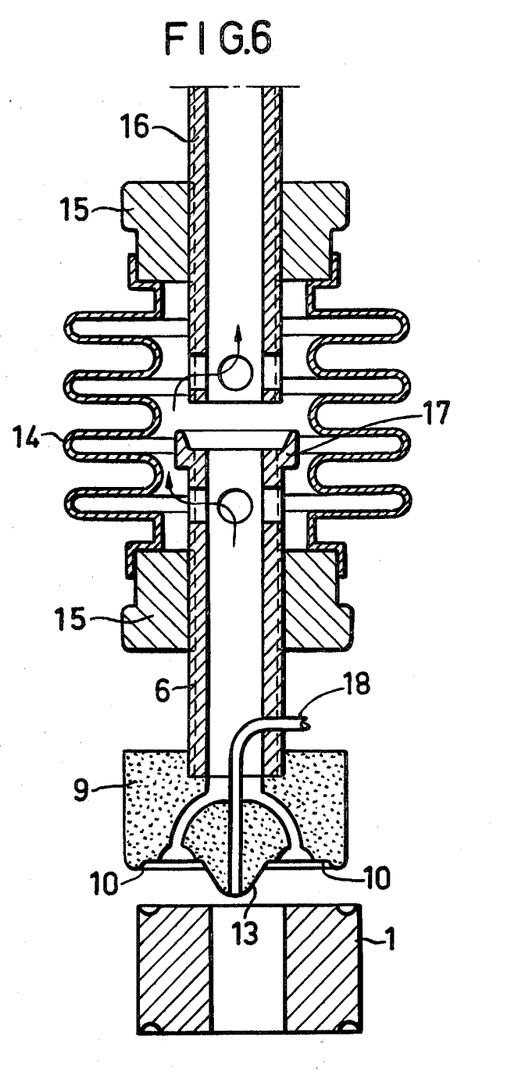
FIG. 6 is a side view, in section, of an intermediate means, by which the grasping device of FIG. 5 may be connected to an industrial robot arm.

When the grasping device 9 is used, the tube 6 is connected to a movable arm (not shown) of an industrial robot. In FIG. 6 there is shown how a grasping device 9 of the kind shown in FIG. 5 is connected to said arm through intermediate means including a bellows 14, one end of which is hermetically secured to the tube 6 by a bushing 15. The opposite end of the bellows 14 is secured in a corresponding manner by a similar bushing 15 to a tube 16, which is rigidly connected to the arm (not shown) of the industrial robot. The bellows 14 is flexible in such a manner that the tube 6 with the grasping device 9 is free to swing in all vertical planes through the main axis of the tube 16, and further the tube 6 is movable upwardly to an upper extreme position, in which the lower end of the tube 16 abuts an extreme position guide means 17 provided in the upper end of the tube 6.

The apparatus of FIG. 6 operates in the following manner. As shown, the arm of the industrial robot has moved the grasping device 9 to a position directly above the point where the object 1 is expected to be situated for collection. The object 1, however, may actually be situated in another position slightly different from the ideal, expected position. When the arm of the industrial robot moves the grasping device downwardly there is an automatic correction of the deviation of position such that the projection 13 slides into the central aperture of the object 1, whereby the flexible bellows 14 permits the grasping device 9 with the tube 6 to enter the correct position for lifting the object 1. To facilitate the correct alignment, the projection 13 may be provided with a friction reducing coating, e.g., polytetrafluorethylene. Subsequently, a vacuum source (not shown) is connected to the tube 16, whereby the grasping device 9 seizes the object 1 by suction action. As the contact surfaces 10 of the grasping device 9 are adapted with close tolerances to the shape of the object 1 in consequence of the casting, all forces by which the grasping device acts upon the object wil be of acceptable magnitude all over the contact surface between the object 1 and the grasping device 9.

When the object 1 has been lifted from its support, the pressure in the tube 16 is further reduced, whereby the bellows 14 is contracted until the extreme position guide means 17 abuts the end of the tube 16. Due to the extreme position guide means 17, the tube will be in a position which is well defined with respect to the tube 16 and thereby also with respect to the arm of the industrial robot, whereby the object 1 can be brought to and delivered in a position which is defined with close tolerances.

In FIG. 6 there ar also shown apertures, by which the tube 6 and 16 communicate with the bellows 14. Further, the grasping device 9 is provided with a tube 18, by which the central aperture of the operate 1 communicates with the ambient atmosphere, thereby preventing the object 1 to be sucked quickly upwardly at the supporting surface at the moment it is lifted.

Figure 7:
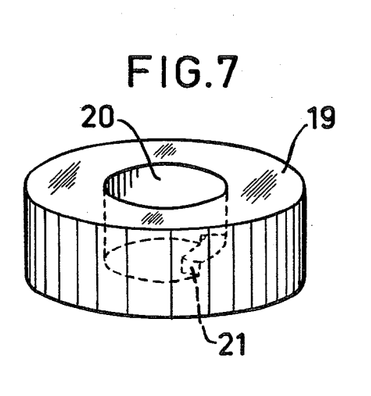
FIG. 7 is a view of another object to be handled by an industrial robot.
Figure 8:
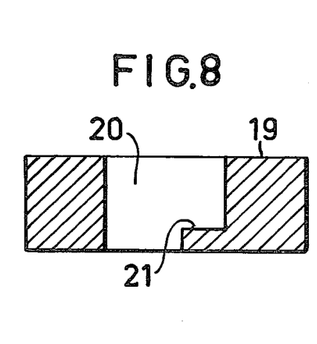
FIG. 8 is a section through the object shown in FIG. 7.
Figure 9:
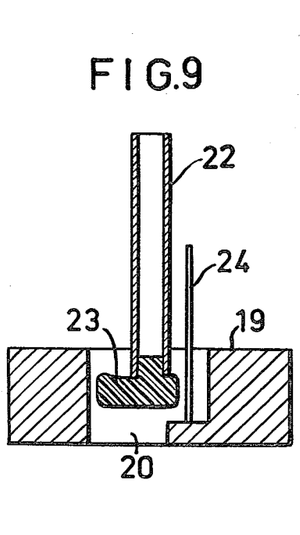
FIGS. 9–11 are side views, in section, of various steps of the manufacture of a grasping device according to the invention for the handling of the object of FIG. 7 by an industrial robot.
Figure 10:
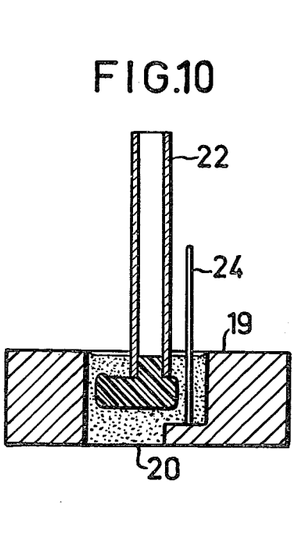
Figure 11:
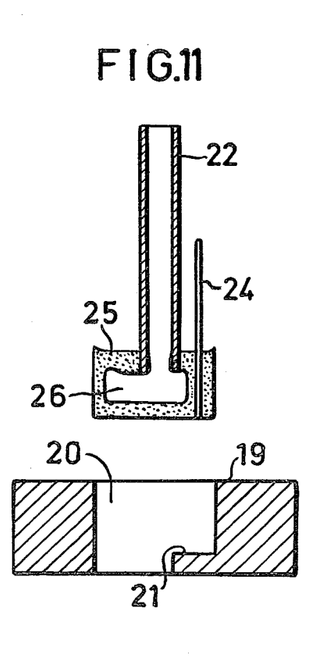

The invention is not limited to vacuum operated grasping devices. FIGS. 9–11 show various steps of the manufacture of a grasping device according to the invention for the handling of such objects 19 that are shown in FIGS. 7–8, i.e., objects having a cylindrical shape and a central aperture 20, in which a shoulder 21 is provided. In FIG. 9, a tube 22 with a lump 23 of meltable substance has been arranged in the central aperture 20 of the object 19. Further, a thin sensor means 24 has been fixed in such a manner that the sensin zone thereof is situated immediately above the shoulder of the object. In FIG. 11 the central aperture 20 has been filled with an elastic curable substance of the same kind that is utilized in the arrangement of FIG. 4. Subsequent to the setting of the curable substance, the melting substance in the lump 23 is removed. In FIG. 11 the completed grasping device 25 is shown having sensor means 24 and a closed cavity 26, which is connected to and may be pressurized through the tube 22. Thus there has been provided a grasping device 25 in the shape of an expandable body, the lower surface of which has been cut level.

When the pressure in the cavity 26 is increased through the tube 22, the elastic material in the grasping device 20 will expand. If that happens when the grasping device 20 has been moved down into the central aperture 20 of the object 19 the latter will be squeezed tightly onto the grasping device 20, which is able to lift and move the object due to the increased friction between the outer walls of the grasping device 25 and the inner walls of the object 19. The shape of the aperture 20 is unimportant as the aperture between the lump 23 and the inner walls of the object 19 has been filled with a liquid cast composition, which solidifies to correct shape within the actual space. The shrinkage of 1–3% that may occur at the setting of said cast composition provides that the fitting of the grasping device 25 into the central aperture 20 at collection of the object 19 may be performed within the positioning tolerances of normal industrial robots. The object 19, however, must be situated, within close tolerances, in the expected ideal collecting position.

By means of the sensor 24, an accurate orientation of the object 19 with respect to the grasping device 25 is obtainable; thus, if the grasping device 25 is rotated within the aperture 26 searching for the shoulder 21, the sensor means 24 will produce an output only when the edge of the shoulder 21 is in a predetermined position with respect to the grasping device 25, whereby the pressure in the cavity 26 is increased in response to said output.

Figure 12:
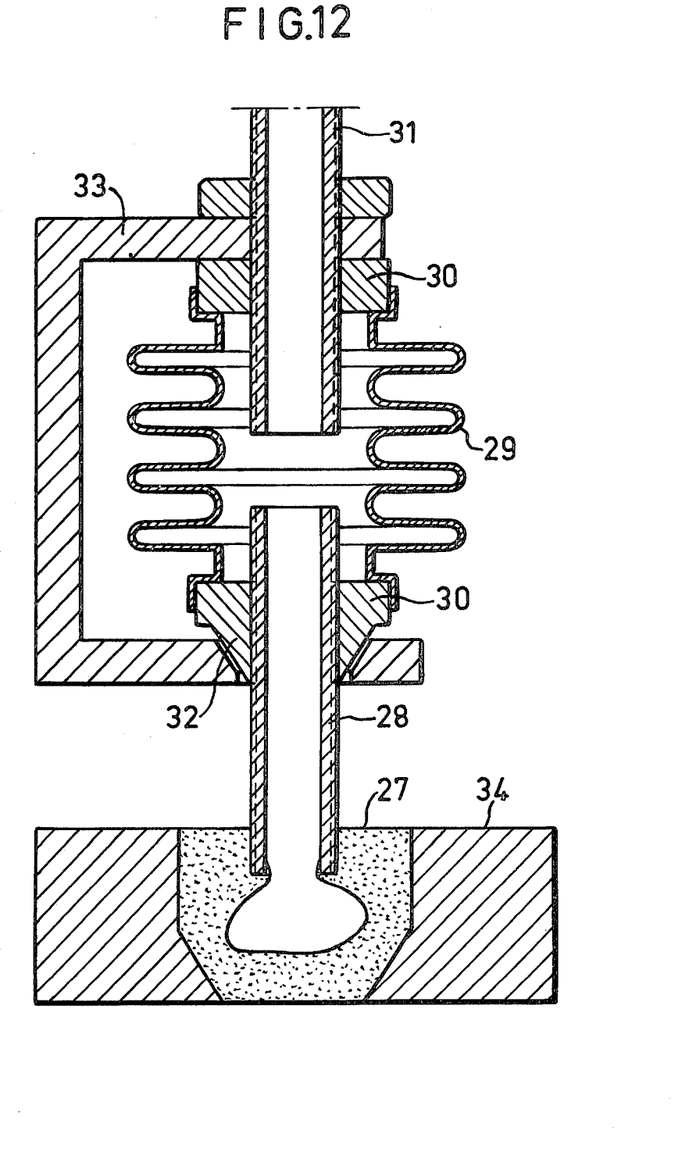
FIGS. 12–13 are side views, in section, of further embodiments of intermediate means, by which grasping devices may be connected to industrial robot arm.

In FIG. 6 there is shown an arrangement having a grasping device 9 of vacuum type, which arrangement is capable of collecting objects from a position defined with moderate tolerances and delivering each object in another position defined with close tolerances. In FIG. 12 there is shown a pressure type arrangement having similar properties.

The grasping device 27 shown in FIG. 12 is manufactured in the same manner as disclosed in FIGS. 9–10. The grasping device 27 is connected to the movable arm (not shown) of an industrial robot by intermediate means including a bellows 29, one end of which is hermetically secured to the tube 28 of the grasping device 27 by a bushing 30. The opposite end of the bellows 29 is secured in a corresponding manner by a similar bushing 30 to a tube 31, which is rigidly connected to the arm (not shown) of the industrial robot. The bellows 29 is flexible in such a manner that the tube 28 with the graspng device 27 is free to swing in a pendulum manner within certain limits, and further the tube 28 is movable down to a lower extreme position, in which an extreme position guide means 32 secured to the tube 28 abuts the walls of a funnel shaped aperture in a support 33, which is secured to the tube 31. By reasons of the inclined surfaces of the lower part of the grasping device 27, the latter is guided into the central aperture of the object 34 in a manner similar to that of the grasping device of FIG. 6. Subsequently the pressure in the tube 31 is increased, whereby the grasping device expands and the object 34 can be lifted.

In the position shown in FIG. 12 the object 34 has just been lifted from its support. Immediately afterwards the pressure in the tube 31 is further increased, whereby the bellows 29 is expanded until the extreme position guide means 32 is pressed against the support 33. Thus, the tube 28 is in a position, which is well defined with respect to the tube 31 and thereby also with respect to the arm of the industrial robot, whereby the object 34 can be brought to and delivered to a position which is defined with close tolerances.

Figure 13:
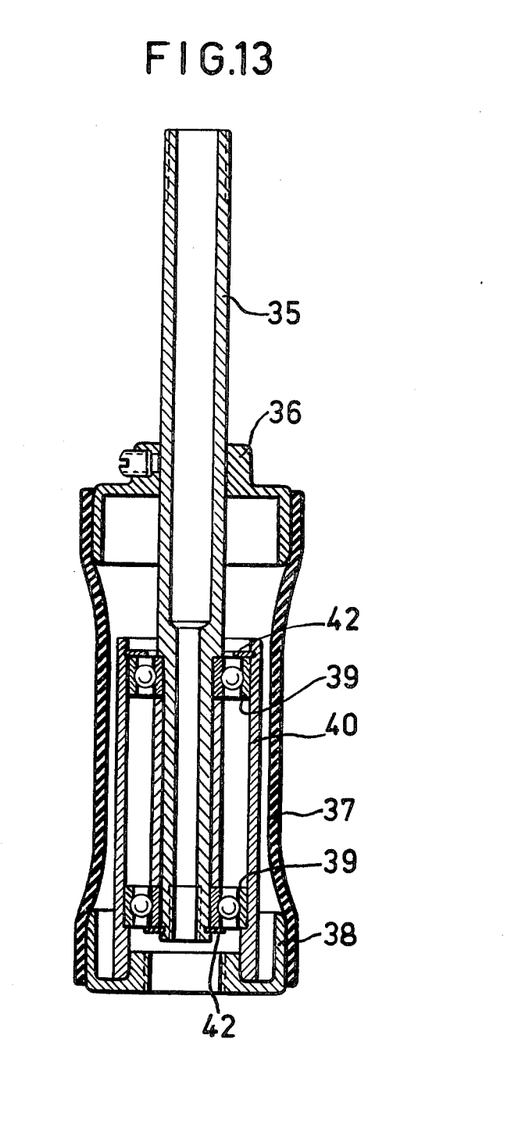

The arrangement of FIGS. 6 and 12 may comprise a brass bellows, which are essentially non-yielding to torsional forces. When handling assymmetrical objects this non-yielding property has the disadvantage, that the grasping device is unable to compensate for angular deviations of the actual object position with respect to the expected ideal collecting position. To obtain automatic correction also for angular deviatons, one embodiment of the invention includes a torsion element between the grasping device and the arm of the industrial robot. One example of such a torsion element is shown in FIG. 13. The torsion element includes a tube 35 one end of which is rigidly connected to the arm (not shown) of an industrial robot. By means of a bushing 36, the tube 35 is further connected to one end of a rubber tube 37, the opposite end of which is rigidly connected to another bushing 38. The tube 35 is rotatably journalled by two ball bearings 39 in an intermediate tube-shaped means 40, which is rigidly connected to the bushing 38, in the central aperture of which a tube with gripping device is intended to be fastened, e.g., the tube 16 in FIG. 6 or the tube 31 in FIG. 12. Locking rings 42 lock the construction. Upper locking ring 42 fits into a mating annular recess in means 40 while the corresponding lower ring 42 fits into a mating recess in tube 35 so as to prevent axial movement of means 40 relative to tube 35, while bearings 39 permit rotational movement of means 40 relative to tube 35 as restrained by the resiliency of tube 37. By means of the disclosed arrangement, automatic orientation of a grasping device is obtainable for correction of angular deviations of the actual object position with respect to the expected ideal collecting position. Thus, bushing 38 is free to rotate relative to tube 35 only subject to the constraints imposed by the resiliency of rubber tube 37.

Figure 14:
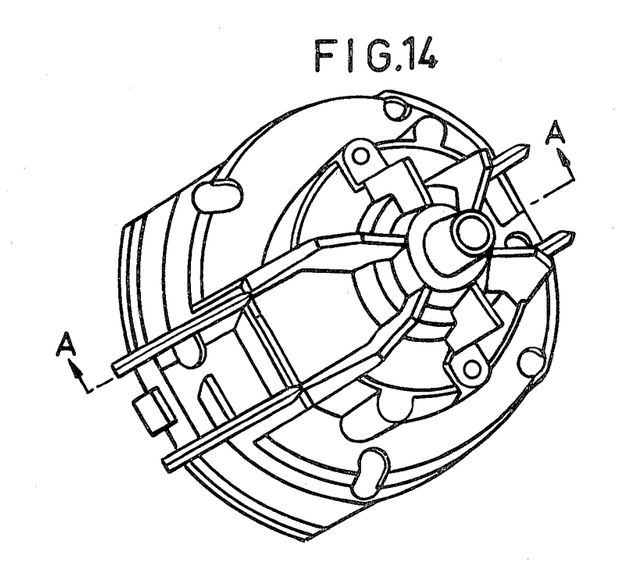
FIG. 14 is a view of an object, a motor housing end wall, which is to be handled by an industrial robot.
Figure 15:
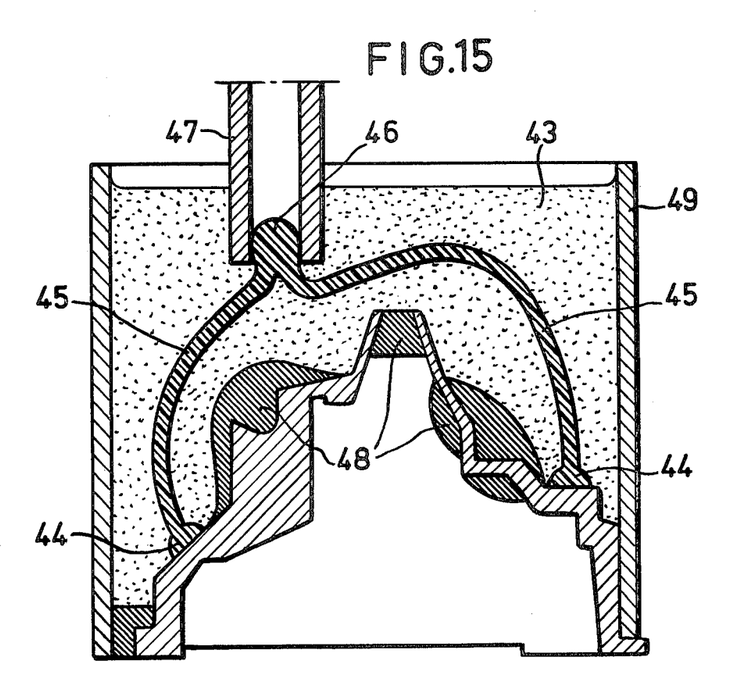
FIG. 15 is a side view, in section, of one step of the manufacture of a grasping device according to the invention for the handling of the object of FIG. 14 by an industrial robot.

A great advantage with the present invention is its ability to handle objects of almost any shape and material. In the embodiments described above, the objects have comparatively simple shape. As an example an object of a more complicated shape there is shown in FIG. 14 a motor housing end wall, and in FIG. 15 there is shown one step of the manufacture of a grasping device in a cross-section A - A through the end wall when cast composition 43 has been applied thereon. Elevations 44 of limited size are provided as described above and two strings 45 of flexible tube are in their upper ends connected to a plug 46, which is inserted in a tube 47. Further easily formable substance 48 has been used to fill cavities having negative relief angle and to seal apertures so that the cast composition 43 only fills the desired space when it is introduced into the casting mould 49. When the casting composition 43 has set or is solidified, the mould 49 is removed together with the object upon which the casting has been made. The substance 48, the elevations 44, the strings 45 and the plug 46 are melted by heat treatment, whereafter the grasping device is ready for use.

What I claim is:

1. Apparatus for coupling to a controllably movable element for grasping, moving and delivering objects from a first location defined by a first set of positional tolerances to a second location defined by a second set of positional tolerances which may be different from said first set, said apparatus comprising:
    a first elongate rigid member having a first end portion thereof rigidly coupled to said movable element and having also a second end portion,
    a second elongate rigid member having a first end portion supporting a releasable connecting means for selective connection to the object to be moved and having also a second end portion,
    said releasable connecting means comprising an elastic member defining a concave cavity communicating with the interior of said hollow tube constituting said second member, and means on said elastic member for sealingly engaging the object so as to define between said cavity and a surface of the object contacted by said elastic member a hollow vacuum chamber to enable suction engagement of the object to said elastic member in response to a less-than-atmospheric pressure in said second chamber,
    intermediate coupling means comprising an air-tight bellows for connecting said second end portion of said first member to said second end portion of said second member and for normally permitting a predetermined amount of relative angular motion between said first and second members in the absence of a pneumatic control signal,
    control means for rigidly coupling together said second portions of both said first and second members to permit substantially no relative angular movement between said first and second members in response to said pneumatic control signal,
    said first and second members comprising hollow tubes and said control signals being transmitted through at least one of said tubes, and
    said releasable connecting means being also responsive to said pneumatic signal in said second member for selectively gripping and releasing the object.

2. The apparatus of claim 1 which further includes means defining air passageways between the interior of said bellows and the interior of both hollow tubes constituting said first and second members,
    said control means comprising cooperating surfaces on the second ends of both said first and second members which are brought into abutting substantially rigid engagement in response to a predetermined contraction of said bellows resulting from a decrease in pressure in said first and second members of a predetermined magnitude.

3. The apparatus of claim 1 which includes a torsion element for permitting also limited relative rotational movement between said first member and said movable element.

4. Apparatus for coupling to a controllably movable element for grasping, moving and delivering objects from a first location defined by a first set of positional tolerances to a second location defined by a second set of positional tolerances which may be different from said first set, said apparatus comprising:

a first elongate rigid member having a first end portion thereof rigidly coupled to said movable element and having also a second end portion, a second elongate rigid member having a first end portion supporting a releasable connecting means for selective connection to the object to be moved and having also a second end portion, said releasable connecting means comprising an elastic deformable element having an exterior configuration which matingly corresponds with that of a cavity formed in the object to be moved, said deformable element also defining an interior cavity which communicates with the hollow interior of said second member, said deformable element becoming distended by an increase in air pressure in said element after it is placed in the cavity of the object to thereby frictionally engage the object, intermediate coupling means comprisng an air-tight bellows for connecting said second end portion of said first member to said second end portion of said second member and for normally permitting a predetermined amount of relative angular motion between said first and second members in the absence of a pneumatic control signal, control means for rigidly coupling together said second portions of both said first and second members to permit substantially no relative angular movement between said first and second members in response to said pneumatic control signal, said first and second members comprising hollow tubes and said control signals being transmitted through at least one of said tubes, and said releasable connecting means being also responsive to said pneumatic signal in said second member for selectively gripping and releasing the object.

5. The apparatus of claim 4 which further includes means defining air passageways between the interior of said bellows and the interior of both said hollow tubes constituting said first and second members, said control means comprising means responsive to the extension of said bellows caused by a predetermined increase in said pneumatic signal to substantially interlock said first and second members.

6. The apparatus of claim 4 which includes a torsion element for permitting also limited relative rotational movement between said first member and said movable element.

* * * * *